United States Patent
Gast et al.

[15] 3,653,212
[45] Apr. 4, 1972

[54] EXHAUST EMISSION CONTROL SYSTEM

[72] Inventors: Richard A. Gast, Southfield; Harry R. Mitchell, Bloomfield Hills, both of Mich.

[73] Assignee: General Motors Corporation, Detroit, Mich.

[22] Filed: Oct. 30, 1970

[21] Appl. No.: 85,379

[52] U.S. Cl. ................................................60/30 R, 60/32 M
[51] Int. Cl. ..........................................................F01n 3/10
[58] Field of Search .......................................60/30 R, 32 M

[56] References Cited

UNITED STATES PATENTS 2,841,951  7/1958  Whitcomb................................60/32 M
2,847,820  8/1958  Leach......................................60/32 M
3,468,124  9/1969  Hraboweckyj..........................60/30 R

FOREIGN PATENTS OR APPLICATIONS 1,926,041  1/1970  Germany................................60/30 R Primary Examiner—Douglas Hart
Attorney—Jean L. Carpenter and Arthur N. Krein

[57] ABSTRACT

An exhaust emission control system for an internal combustion engine having an air injection system in which exhaust system pressure pulsations are used to induce air flow through an air induction valve to the engine exhaust ports to deliver air to the stream of exhaust gases as they are emitted from the combustion chambers.

10 Claims, 12 Drawing Figures

PATENTED APR 4 1972 3,653,212

INVENTORS
Richard A. Gast &
BY Harry R. Mitchell
Arthur N. Krein
ATTORNEY

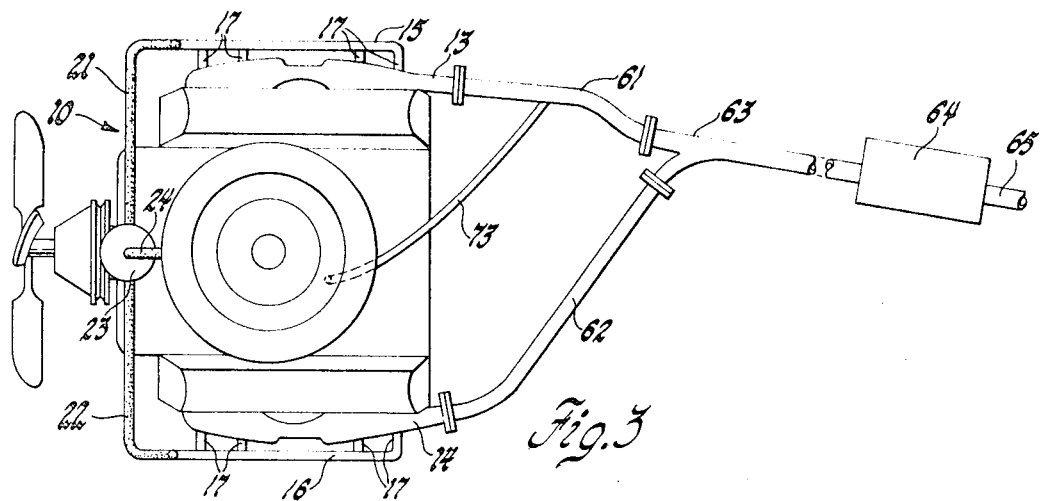

INVENTORS
Richard A. Gast &
Harry R. Mitchell
BY
Arthur N. Krein
ATTORNEY

EXHAUST EMISSION CONTROL SYSTEM

During recent years, increasing emphasis has been placed on reducing the amount of unburned constituents, such as hydrocarbon and carbon monoxide present in the exhaust gases emitted from internal combustion engines. One of the most effective arrangements devised to accomplish this reduction is the air injection reactor system. In this system, an engine driven air pump delivers air to the stream of hot exhaust gases as they are emitted from the engine combustion chambers. Utilizing the heat of the exhaust gases, the injected air supports additional burning of the exhaust gases in the engine exhaust passages to reduce the amount of unburned constituents in the exhaust gases discharged to the atmosphere.

Other air injection reactor systems have been proposed in which the air pump is replaced by eductors embodied in the cylinder head of the engine, as disclosed, for example, in U.S. Pat. Nos. 3,285,002 and 3,335,564 issued on Nov. 15, 1966, and Aug. 15, 1967, respectively, to Eugene W. Hines, but these arrangements add significantly to the cost of the engine, in fact, probably costing more than the air pump which they are intended to replace.

Prior to the introduction of the above-identified air injection reactor systems, it had previously been suggested to introduce air into the exhaust system of an internal combustion engine through specially constructed vibration frequency responsive valves. However, none of the last mentioned systems delivered the air to the stream of hot exhaust gases as they are emitted from the engine combustion chambers directly adjacent to the exhaust valves nor were they adequate to induce sufficient flow of air into the exhaust system to reduce the amount of unburned constituents in the exhaust gases to meet present day emission control standards.

Accordingly, it is an object of this invention to improve an exhaust emission control system whereby exhaust system pressure pulsations are used to induce sufficient air flow into the exhaust system of an internal combustion engine to support additional oxidizing or burning of the exhaust gases in the engine exhaust passages and thereby reduce the amount of unburned constituents in the exhaust gases to a level below the presently forecast emission control standards for internal combustion engines in motor vehicles.

Another object of this invention is to provide an improved exhaust emission control system whereby, through the proper selection of exhaust system length and configuration, sufficient air is induced to flow to the engine exhaust ports by means of exhaust system pressure pulsations.

These and other objects of the invention are obtained by means of an exhaust emission control system for and internal combustion engine in which an engine having an N number of combustion chambers is provided with a plurality of exhaust conduits, each of which is connected to a maximum of N/2 number of combustion chambers and each exhaust conduit is provided with passages to direct air toward the combustion chambers exhausting into that exhaust conduit, the passages being connected by an air induction valve to the atmosphere, each of the exhaust conduits being of a predetermined length for a particular range of engine operating speeds to effect maximum flow of air into the exhaust system.

For a better understanding of the invention, as well as other objects and further features thereof, reference is had to the following detailed description of the invention, to be read in connection with the accompanying drawings, wherein:

FIG. 3 is a top view of an engine similar to that of FIG. 2 with an exhaust Y-connection and a modified exhaust crossover system;

FIG. 4 is a top view of the air induction valve assembly of FIG. 1 with parts broken away to show details of its structure;

FIG. 5 is a sectional view of the air induction valve assembly taken along line 5—5 of FIG. 4;

FIG. 5a is an enlarged view of a portion of the air induction valve assembly of FIG. 5 showing details of the timing valve arrangement;

Figure 1:
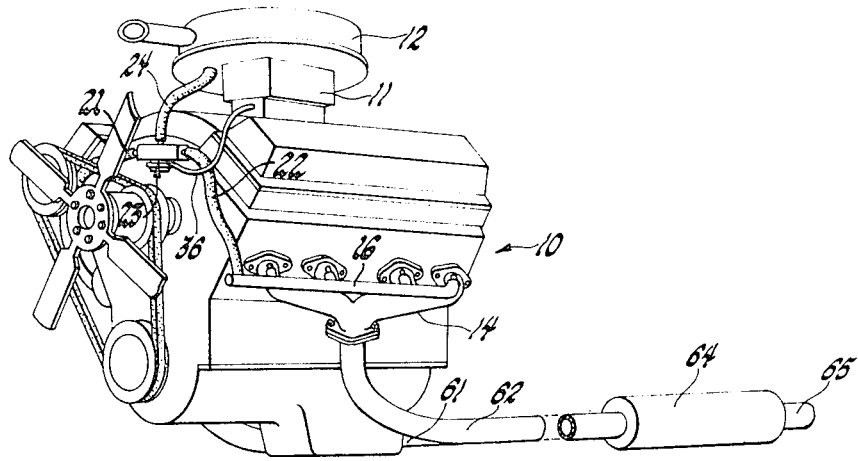
FIG. 1 is a perspective view of an internal combustion engine having an exhaust emission control system in accordance with the invention.
Figure 2:
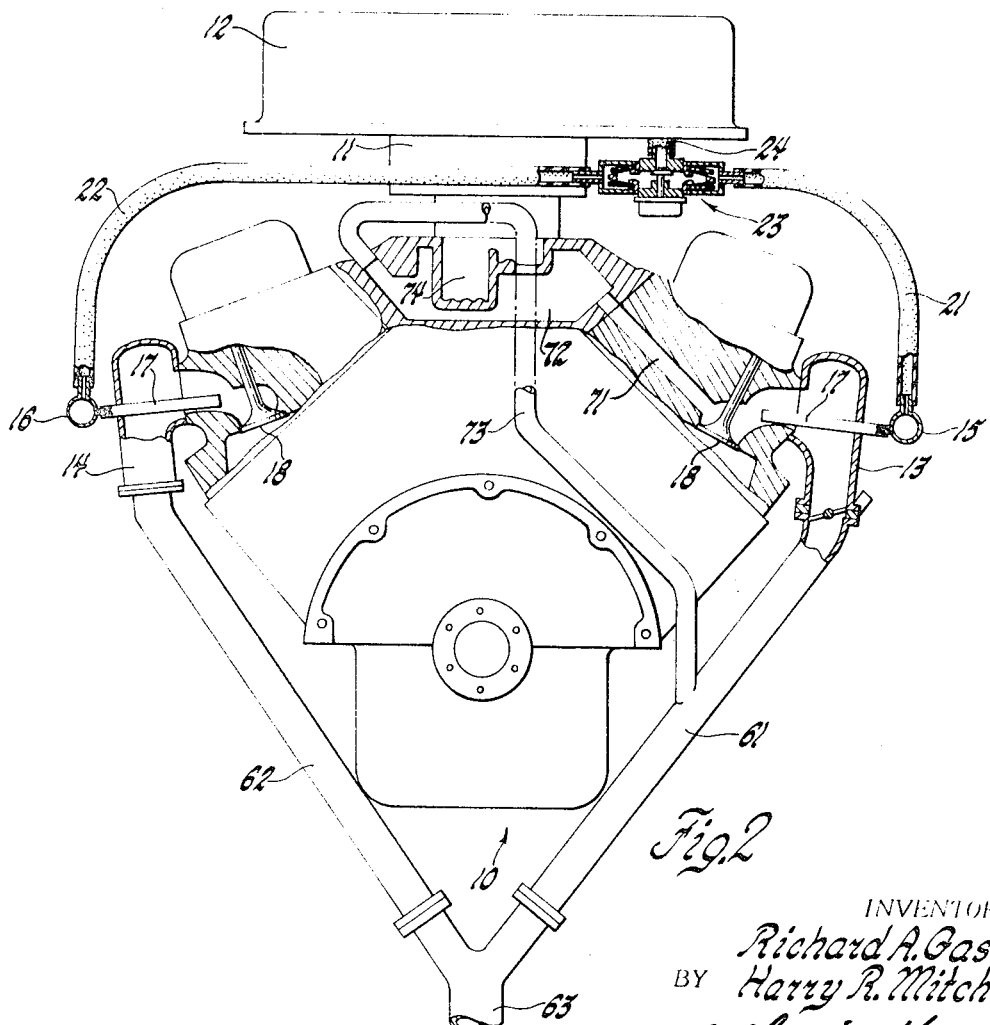
FIG. 2 is an enlarged rear view of the engine of FIG. 1, with parts broken away, to show the details of the air induction tube of the air injection reactor of the exhaust emission control system and showing schematically a modified exhaust crossover in the exhaust system of the engine.

Referring now to FIGS. 1, 2 and 3, there is shown, for purposes of illustration, a V–8 engine 10 which is provided with a carburetor 11 and an air filter 12. The right- and left-hand banks of four cylinders each of the engine are provided with right-hand and left-hand exhaust manifolds 13 and 14, respectively, which are connected to exhaust pipes as described hereinafter. Right- and left-hand air manifolds 15 and 16 are each provided with a series of air injection tubes 17 extending into the respective exhaust manifolds through which air is injected into the stream of exhaust gases adjacent to the combustion chamber exhaust valves 18, as shown in FIG. 2. The air manifolds 15 and 16 are connected by conduits 21 and 22, respectively, to the discharge outlets of an air induction valve assembly, generally designated 23, suitably supported on the engine and, which has its inlet connected to a suitable source of clean air at atmospheric pressure, such as by connection of hose 24 to the air filter 12 downstream of the filter element therein, not shown.

In the operation of the air induction valve 23, as seen in FIGS. 3, 4 and 5, air flows from hose 24 through inlet 25 of valve casing 26 past a spring 27 biased normally open valve 31 into chamber 28. From the chamber 28, the air flows through a plurality of reed-type check valves 32. Reed valves 32 open as the exhaust manifold pressure drops below atmospheric, as explained in detail hereinafter, to permit air flow through the outlets 33 of reed valve covers 34 into conduits 21 and 22, previously described.

In the embodiment of the air induction valve shown, a diaphragm 35 actuated control is adapted to close valve 31 and prevent air injection during engine deceleration to prevent back-firing. Intake manifold vacuum is supplied through hose 36 and tube 37 to the chamber 38 above the pressure responsive diaphragm 35. During deceleration, the high induction vacuum in effect pulls diaphragm 35 upwardly against the bias action of spring 27 to close valve 31. A timing valve 41 in the stem 42 gradually balances the pressure between chamber 38 above diaphragm 35 and the chamber 43 below diaphragm 35 so that the valve 31 is closed only for a predetermined interval.

The air induction valve 23, in the embodiment disclosed, includes the valve casing 26 supporting on opposite sides thereof, valve seat members 44, each enclosed by a reed valve cover 34. Each valve seat member 44 has a passage 45 in communication with chamber 28 and terminating in outlet ports 46. As shown, each valve seat member is provided with two sets of opposed outlet ports 46, discharge through which is controlled by the reed valves 32. Each reed valve 32 is secured at one end with its unsecured end normally seated on the face of the valve seat member 44 around the respective outlet port 46 to effectively close the outlet port. A reed retainer 47 is secured over the fixed end of each reed valve and projects over it in a predetermined arc to limit flexing of its associated reed valve.

The stem 42, which has secured at the reduced end thereof the valve 31, is slideably journaled in the bottom wall of the valve casing 26 and is normally biased downward to the position shown in FIG. 5 by spring 27 to unseat valve 31 from valve seat 48. Diaphragm 35 is secured to the annular base portion of stem 42 and is clamped at its outer periphery between bottom cover 51 and valve casing 26 to form therewith chambers 38 and 43.

Timing valve 41, which is a disc of flexible metal, is provided with a flapper portion formed by an arcuate slot 52 which overlies an annular recess 53 in the base of stem 42, both the diaphragm 35 and timing valve 41 being secured to the stem by retainer 54 fixed thereon. Annular recess 53 is connected by a bleed groove 55 of predetermined size to passage 56 in the stem in communication with chamber 38. With this arrangement during engine deceleration, high induction vacuum introduced in chamber 38 will allow pressure in chamber 43 to move diaphragm 35 upward to close valve 31. At this time, timing valve 41 is closed, but air can bleed between chambers 38 and 43 through the arcuate slot 52, annular recess 53, bleed groove 55 and passage 56. After a time interval, determined by the size of the bleed groove 55, the pressures in chambers 38 and 43 are sufficiently balanced so that spring 27 will again lower valve 31.

If, however, before the pressure in chambers 38 and 43 is substantially balanced as described above, the engine is suddenly accelerated, the pressure in chamber 38 will rise rapidly to reflect the pressure change in the induction manifold. As this occurs, the flapper portion of timing valve 41 will open placing chambers 38 and 43 in direct communication with each other for rapid balancing of the pressure in these chambers to maintain valve 31 open by the biasing action of spring 27.

Referring now to the exhaust emission control system of the invention, exhaust system pressure pulsations in the exhaust system of the engine are used to induce air into the exhaust ports of the engine via the air injection tubes previously described. This technique is advantageous because it does not require engine power and because it replaces the air pump of the previously described prior art air injection reactor systems with high speed check valves which allow air to flow into the exhaust ports when the exhaust pressure in the exhaust system fluctuates below atmospheric pressure. These subambient depressions occur because the pressure waves produced by combustion chamber blowdown reflect from the open end of the exhaust system as expansion waves. To induce sufficient air for emission control, as required by current and proposed emission control standards, the exhaust system must be tailored to produce composite pulsation frequencies which the check valves 32 can follow effectively.

To more clearly understand how air is induced into the exhaust emission control system of the invention, a theory of operation is set forth herein. Consider, for example, a single cylinder engine operating with an attached exhaust pipe. During engine operation, when the exhaust valve opens, a pressure wave pulses from the combustion chamber into the exhaust port and travels at the speed of sound through the exhaust system. The effect of this single exhaust event does not end when the pressure wave passes out the end of the pipe. A wave is reflected back through the pipe, and continued reflections will occur until completely attenuated. Each pressure wave which reaches the open or atmospheric end of the pipe reflects back through the system as an expansion, or rarefication, wave. Similarly, an expansion wave is reflected from the open end of the pipe as a pressure wave. Pressure and expansion waves reflect from the closed exhaust port end of the pipe as pressure and expansion waves, respectively. Thus, several periods of subatmospheric pressure can be generated by reflection from a single exhaust pulse. With vehicle exhaust systems incorporating mufflers and a plurality of pipes, these effects will occur but the constant pressure boundary which creates the expansion waves does not necessarily coincide with the physical end of the tail-pipe.

With typical engine operation, a second exhaust event will occur before reflections from the first pressure wave are attenuated completely. Subsequent waves and their reflections soon combine with one another to form a composite wave which is repeated each engine cycle until operating conditions are changed. When two or more waves encounter one another, the resulting amplitude is the sum of the amplitudes which would occur independently in each wave. After the waves have passed one another, they are unaffected by the encounter.

As a result of the above effects, the number of subatmospheric depressions occuring in one single-cylinder engine cycle, that is, two crankshaft revolutions per engine cycle, is determined by engine speed, the length and shape of the exhaust system and the speed of sound determined by properties of the exhaust gases. The magnitude of the depressions is determined primarily by the pressure level in the combustion chamber at the instant the exhaust valve opens and the attenuation properties of the exhaust system. Both the magnitude and the number of depressions are affected by the exhaust valve opening schedule as determined by the valve actuating cam profile and by the interactions of waves produced by successive exhaust pulses. The air-fuel intake system of the engine may also generate pressure depressions in the exhaust system because the intake valve opens while the exhaust valve is still open, referred to as valve overlap. This is of little concern in a multi-cylinder engine, of the type shown in FIG. 1, because of tailoring of the exhaust system only has been found to produce an effective air induction system for purposes of exhaust emission control.

Considering now a multi-cylinder engine, of the type most commonly used in motor vehicles, wherein several cylinders exhaust to a common manifold, the effects of the pressure waves are much more complex. Waves from several cylinders travel and reflect through the common exhaust pipe. Each wave maintains its identity independently of the other, but where two or more waves are present at the same time, the waves are superimposed. As a result of the superimposability, the firing order of the cylinders which are manifolded together determine the nature of the composite wave produced at any given location within the system. Further, connecting two or more exhaust pipes from the same engine allows the expansion waves from one pipe to reinforce those in the others at certain conditions. These parameters as well as those discussed above which affect the wave from one cylinder, must be considered in the design of an effective pulsing air injection system according to the invention.

In order to induce useful air flow rates, engine and exhaust system components must produce exhaust pressure pulsation frequencies within the limitations established by check valve response in the air induction valve 23 and which result in depressions of sufficient time duration to allow air to accelerate through the valve. Engine speed and the number of static pressure depressions occuring in one engine cycle determine the operating frequency of these check valves. This operating frequency ($f$) can be determined for the purpose of this disclosure as:

$$f = \frac{(\text{r.p.m.}) \, (\text{depressions/cycle})}{(2 \text{ revs./cycle}) \, (60 \text{ sec./min.})}$$

From this formula, it is apparent that for a given engine speed, the operating frequency ($f$) required of the check valves 34 is directly related to the exhaust wave depressions or pulsations per engine cycle. In order to increase the effectiveness of the check valves, it is desirable to decrease the frequency and increase the amplitude of these pressure fluctuations, it being understood that the proper check valves are then selected for operation at this predetermined frequency.

In a multi-cylinder engine consisting of N number of combustion chambers, such as that used in a motor vehicle, the exhaust wave is a composite wave formed by superimposition of the waves from the individual cylinders. This can be taken advantage of by the use of closely connected exhaust ports, such as that obtained with conventional exhaust manifolds connecting N/2 combustion chambers, because the exhaust manifold then acts like a plenum controlled by a relatively long exhaust pipe as described hereinafter. Thus, all exhaust ports closely connected by an exhaust manifold will experience a pressure depression at the same time. They can therefore be supplied by a common group of check valves as shown in FIG. 2 to induce air to flow at the same time.

It has been found, however, that if the exhaust ports of more than N/2 combustion chambers are closely connected as, for example, if the right and left exhaust manifolds of a V–8 engine are relatively closely connected, the composite pressure pulsations will be of relatively low amplitude and high frequency. Thus, if these two exhaust manifolds are relatively closely interconnected as by a conventional exhaust crossover passage used for heating the engine air-fuel mixture, useful air flow rates will be induced only at very low engine speeds. It has now been found that this pulsation frequency can be reduced and the amplitude greatly increased by the elimination of such a relatively close connection between the exhaust manifolds.

It has also been found that maximum air flow occurs when the exhaust blowdown pulses and their reflections combine in a manner to reinforce the exhaust system resonant frequency $f$ which is determined by $f$ = speed of sound/wave length. For each type of exhaust system, this resonant frequency is determined by a characteristic wave length which is dependent on physical pipe lengths and which can be designated or "tuned" to produce maximum air flow at a desired engine speed. This is essential because maximum induced air flow is required in order to effectively combine sufficient air with the hot exhaust gases to reduce emissions to meet present day emission control standards. If the exhaust system is properly tuned, sufficiently high air flow rates will be induced for an engine speed range of several hundred revolutions per minute. This permits an exhaust system design for a given engine speed that will provide high air flow rates for the lower half of the designed engine speed range where emission control is needed the most, it being realized that at higher engine speeds the air-fuel ratio and high exhaust temperatures are such as to cause reduced emission with significantly less induced air flow.

As previously described, an exhaust manifold acts like a plenum controlled by a relatively long exhaust pipe. As such, the exhaust manifold and the exhaust pipe can be tuned by proper selection of the overall effective length of this portion of the exhaust system for different exhaust system configurations.

It has been found that air flow induction systems, as disclosed herein, are effective with all types of exhaust systems, with best results obtained with Y-connected single systems and balance-piped dual systems, the latter system being capable of inducing up to thirty percent higher air flow rates than the former. It has also been found that both of the aforementioned V–8 exhaust systems can be "tuned" for maximum air flow induction with predictable numbers of three and five static pressure depressions for each engine cycle, or two crankshaft revolutions, this predictability resulting in an accurate formulation of the required exhaust lengths for an effective air induction system. Accordingly, only these two exhaust systems are illustrated and described in detail hereinafter.

Figure 6:
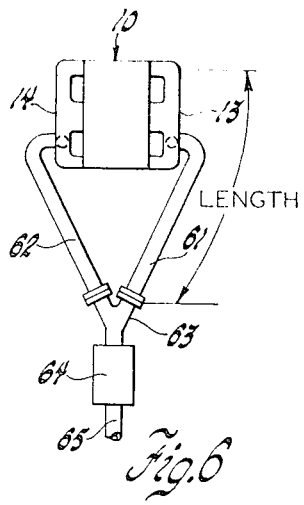
FIG. 6 is a schematic illustration of a symmetrical, single exhaust system for a V–8 engine.
Figure 7:
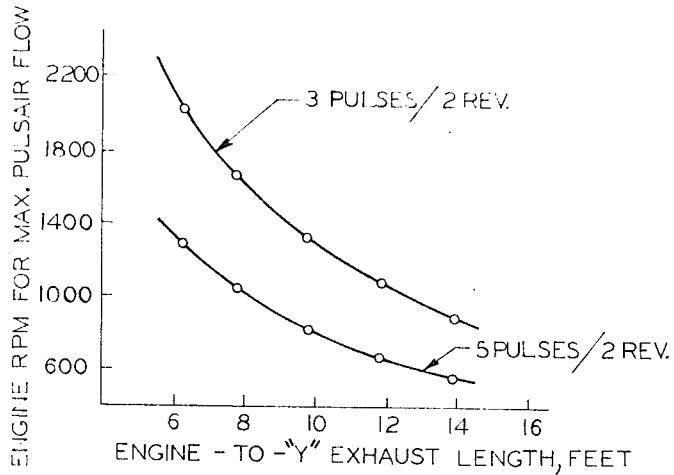
FIG. 7 is a graph showing optimum exhaust length versus engine speed for the symmetrical, single exhaust system of FIG. 6.

Referring now to FIG. 6, there is illustrated schematically a symmetric single exhaust system while FIG. 7 is a graph showing how engine speeds producing maximum induced air flow rates are correlated with the engine to Y-connection length of the exhaust system, the length referred to including the flow length within the exhaust manifold as seen in FIG. 6. As shown, exhaust manifolds 13 and 14 are connected by approximately equal length exhaust pipes 61 and 62, respectively, and Y-connector 63 to a common muffler 64 and tailpipe 65. The critical tuning length of each exhaust system for an engine operating at a predetermined speed is the flow length of the exhaust manifold and the flow length of its associated exhaust pipe up to the Y-connector. In other words, it has been found that the position of the muffler or the length of the tailpipe has no significant effect on induced air flow, if engine to Y-connector lengths are selected from the graph shown in FIG. 7 or determined from the formula to be described hereinafter. In each of FIGS. 7, 9 and 11 graphs are shown for pressure-wave pulse rates of three and five pulses for each engine cycle, but for purposes of this disclosure, the five pulse rate is of primary concern in the formulation of effective air induction systems.

Figure 8:
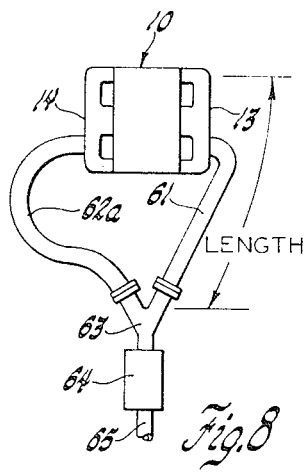
FIG. 8 is a schematic illustration of an asymmetric, single exhaust system for a V–8 engine.

It is not always possible to install a completely symmetrical exhaust system in a vehicle. Mandatory positioning of structural members and drive-train components quite often requires severe asymmetry in the exhaust system to prevent interferences. For this reason, there is shown in FIG. 8 an asymmetric single exhaust system in which the exhaust manifolds 13 and 14 are connected by exhaust pipes 61 and 62a, respectively, of unequal length and by Y-connector 63 to a common muffler 64 and tailpipe 65. In this arrangement, if the difference in length between the two exhaust pipes is less than two feet, then the desired effective engine to the Y-connector exhaust length is the average exhaust length of the two exhaust systems. If the difference in exhaust pipe lengths is greater than two feet, each bank of the system will effect peak flow at different speeds and each bank will have unequal induced flow rates for a given engine speed.

Figure 9:
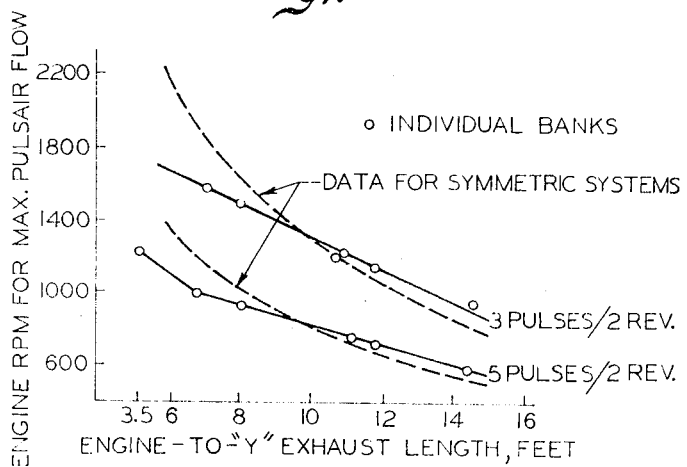
FIG. 9 is a graph showing optimum exhaust length versus engine speed for the asymmetric, single exhaust system of FIG. 8.

The conditions for maximum induced air flow rates are plotted by the solid line in FIG. 9 for exhaust systems with exhaust lengths differing by approximately 4 feet. For comparison, the graph for symmetric systems are indicated by the dotted curves in this same figure.

Although the Y-connectors are shown as being symmetrical with equal entry angles of approximately 45° into the discharge portion of the connector, it is to be realized that the configuration of the connector can be varied so that the two exhaust conduits can be joined at any desired suitable angle into the final exhaust conduit discharging into the muffler 64.

Figure 10:
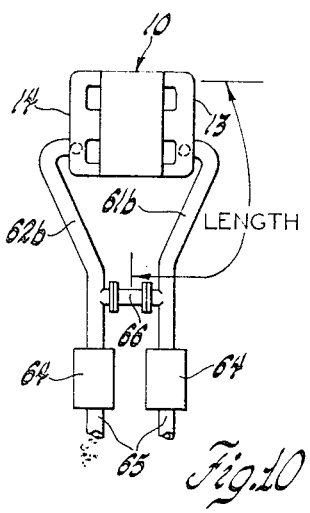
FIG. 10 is a schematic illustration of dual exhaust system with balance pipe for a V–8 engine; and, FIG. 11 is a graph showing optimum exhaust length to balance pipe versus engine speed for the dual exhaust system of FIG. 10.
Figure 11:
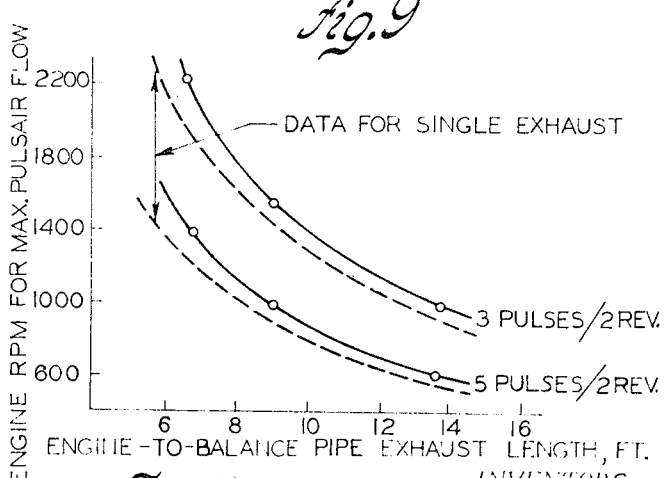

In FIG. 10, there is shown a dual exhaust system with a balance pipe 66 interconnecting exhaust pipes 61b and 62b upstream in terms of exhaust flow from the dual mufflers 64. In this arrangement, the lengths of the exhaust system to effect tuning is from the engine to the mid-point of the balance pipe for each bank of the exhaust system. In FIG. 11, there is plotted the graph of the required lengths of the exhaust system against engine speed for a dual exhaust system with balance pipe, this graph being shown by the solid line and for comparison purposes, there is shown by the dotted line the data for a single exhaust system. Although balance pipe 66 is shown as being connected at a right angle to both exhaust pipes 61b and 62b, these connections can be made at any desired angle.

Although not shown, it is obvious that a dual exhaust system without balance pipe can also be used to effectively induce air flow for exhaust emission control systems, but it has been found that such a dual system without balance pipe is not as effective and can be relatively noisy as compared to the described preferred dual exhaust systems with balance pipe.

While graphs similar to those shown in FIGS. 7, 9 and 11 can be determined empirically for any given engine and exhaust system, the following equation can be used to determine the length of an exhaust system for any V–8 engine with an accuracy of plus or minus 1 foot:

$$L = \frac{12270 - 0.625(A/M)S}{S + 231} + 6.4e^{-(V/104)} - 3.9 \text{ feet}$$

where:

$L$ = exhaust length (engine-to-connection of exhaust pipes), ft.; distance from most distant combustion chamber to first interconnection between exhaust pipes $A$ = flow area of exhaust pipe(s), in.²

$S$ = engine speed for maximum Pulsair flow, revolutions per minute; this engine speed being selected with regard to the operating speed range at which the greatest emission would occur for that engine under normal operating conditions M = number of pipes from exhaust connection to muffler(s)
   1 - single "Y"-connected systems
   2 - dual with balance pipe
V = volume of exhaust manifold for four cylinders, in.$^3$
e = the base of the natural system of logarithms; the number 2.7182818+

If heating of the inducted air-fuel mixture for the engine is desired, the subject exhaust emission control system can be used by incorporating therein a modified exhaust crossover, as for example, the system as disclosed in FIGS. 2 and 3. In this arrangement, the conventional exhaust crossover loop from one exhaust manifold to that of the other bank is eliminated and, instead, as shown, the right-hand bank of the engine has an outwardly leading exhaust passage 71 which connects with an exhaust cross-passage 72 connected to a secondary exhaust pipe 73 that is connected back to the right-hand exhaust pipe 61 upstream, in terms of direction of the exhaust flow, of the Y-connector 63. This structure permits hot exhaust gases from the right-hand bank of the engine to flow through the exhaust cross-passage 72 to heat the inducted air-fuel mixture as it flows through duct 74 forming part of the intake manifold for the engine. Alternately, the second exhaust pipe 73 instead of being connected to the exhaust pipe 61, can be connected, not shown, into the air-fuel induction passage of the engine. In determining the required tuning length for an engine in the event that no exhaust passages are provided for heating the air-fuel mixture, then the predicted length for a Y-connected system only should desirably be increased by three-fourths of a foot from the result obtained from the previously described equation.

In the above described equation, the tolerance of plus or minus one foot allows for differences in exhaust temperature for a given engine design and for the acoustic conductivity of the exhaust interconnections. Including these variables in the above equation would have caused excessive complications in terms of the benefits to be derived by their inclusion therein and, therefore, they are not included as variables in the above described equation to determine a suitable design length for the effective exhaust length for a given engine.

The subject exhaust emission control system is also suitable for use on either a six-cylinder engine, not shown, or on a four-cylinder engine, not shown. In the case of a six-cylinder engine, if the engine is a V-6, each bank of cylinders would be isolated from the other bank of cylinders as in the V-8 engine of FIG. 1. If the engine is an in-line six-cylinder engine, exhaust manifolding can be on either a 3—3 basis or a 4—2 basis, the 3—3 cylinder arrangement being preferred since it will provide equal air flow to the two exhaust manifolds and higher induced air flow rates over a wider speed range than with the 4–2 cylinder arrangement.

What is claimed is:

1. An exhaust emission control system for use on an internal combustion engine having an N number of combustion chambers, said system including a first exhaust conduit means, a second exhaust conduit means, each of said exhaust conduit means being connected to a maximum of N/2 number of combustion chambers, a first passage means and a second passage means connected to said first exhaust conduit means and to said second exhaust conduit means, respectively, positioned to direct air into said first exhaust conduit means and said second exhaust conduit means toward the respective set of said combustion chambers, valve means including check valves connected to said first passage means and to said second passage means and in communication with the atmosphere and, conduit means interconnecting said first exhaust conduit means with said second exhaust conduit means, the length of at least said first exhaust conduit means upstream of said interconnecting conduit means to the most distant combustion chamber, in terms of the normal flow path of engine exhaust, being greater than 6 feet and less than 14 feet.

2. An exhaust emission control system according to claim 1 wherein both said first exhaust conduit means and said second exhaust conduit means are greater than 6 feet and less than 14 feet.

3. An exhaust emission control system according to claim 1 wherein said conduit means interconnecting said first exhaust conduit means with said second exhaust conduit means is a connector having a first intake portion connected to said first exhaust conduit means, a second intake portion connected to said second exhaust conduit means and, a common exhaust discharge portion.

4. An exhaust emission control system according to claim 1 wherein said conduit means interconnecting said first exhaust conduit means with said second exhaust conduit means is a balance conduit with one end connected to said first exhaust conduit means and the other end connected to said second exhaust conduit means.

5. An exhaust emission control system according to claim 1 wherein said first exhaust conduit means further includes an exhaust crossover conduit to the engine for preheating of the induction air-fuel mixture with a return passage to said first exhaust conduit means.

6. An exhaust emission control system according to claim 2 wherein said conduit means interconnecting said first exhaust conduit means and said second exhaust conduit means is a balance conduit connected at opposite ends to said first exhaust conduit means and to said second exhaust conduit means and wherein said effective lengths of said first exhaust conduit means and said second exhaust conduit means each include half the length of said balance conduit.

7. An exhaust emission control system for use on a V-8 internal combustion engine having an N number of combustion chambers, said system including a first exhaust conduit means and a second exhaust conduit means each of which is connected to N/2 number of combustion chambers, first passage means and second passage means connected to said first exhaust conduit means and said second exhaust conduit means, respectively, to direct aeriform fluid toward said combustion chambers, valve means connected to said first passage means and said second passage means and to a source of aeriform fluid at atmospheric pressure, and conduit means interconnecting said first exhaust conduit means and said second exhaust conduit means, the effective length of at least said first exhaust conduit means being equal to length $L$, plus or minus 1 foot according to the equation:

$$L = \frac{12270 - 0.625(A/M)S}{S + 231} + 6.4e^{-(V/104)} - 3.9 \text{ feet}$$

where:
L = exhaust conduit means length (most distant combustion chamber-to-first interconnection of exhaust pipes), ft.
A = flow area of exhaust pipe (s), in.$^2$
S = engine speed for maximum Pulsair flow, rpm
M = number of pipes from exhaust connection to muffler (s)
   1. - single "Y"-connected systems
   2. - dual with balance pipe
V = volume of exhaust manifold for four cylinders, in.$^3$ 8. An exhaust emission control system according to claim 7 wherein both said first conduit means and said second conduit means are of approximately equal lengths.

9. An exhaust emission control system according to claim 7 wherein said first exhaust conduit means further includes an exhaust crossover conduit to the engine for preheating of the induction air-fuel mixture to the engine, with a return passage to said first exhaust conduit means downstream from said combustion chambers in the direction of normal flow of exhaust gases.

10. An exhaust emission control system according to claim 7 wherein said first exhaust conduit means includes a first exhaust manifold for one bank of the V-8 engine combustion chambers and said second conduit means includes a second exhaust manifold for the other bank of combustion chambers.

* * * * *